(12) United States Patent
Yang et al.

(10) Patent No.: US 11,570,396 B1
(45) Date of Patent: Jan. 31, 2023

(54) AUDIO TRICK MODE

(71) Applicant: DISH NETWORK L.L.C., Englewood, CO (US)

(72) Inventors: Yunfeng Yang, Aurora, CO (US); John Barbieri, Littleton, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 17/535,193

(22) Filed: Nov. 24, 2021

(51) Int. Cl.
*H04N 5/783* (2006.01)
*H04N 5/92* (2006.01)

(52) U.S. Cl.
CPC .................................. *H04N 5/92* (2013.01)

(58) Field of Classification Search
CPC ...................................................... H04N 5/92
USPC ........ 386/343, 347, 285, 326, 345, 350, 241
See application file for complete search history.

(56) References Cited

U.S. PATENT DOCUMENTS

2007/0106762 A1* 5/2007 Kim ................. H04N 21/43622
709/219

FOREIGN PATENT DOCUMENTS

JP 2004509491 A * 3/2004
JP 102004051091 B4 * 7/2018

* cited by examiner

*Primary Examiner* — Robert Chevalier
(74) *Attorney, Agent, or Firm* — Oliff PLC (57) ABSTRACT

Various embodiments of apparatus, systems and/or methods are described for independently controlling an audio stream relative to a video stream in audio trick mode. In one example, an audio stream and a video stream is received, where the audio stream comprises frames that correspond to corresponding frames of the video stream. The audio and video streams are played from a first time to a second time at a first speed. An input to time shift the audio stream independent of the video stream is received, and after receiving such, the audio stream is time shifted to the first time. Then, the audio stream may be re-played from the first time to the second time at a second speed different from the first speed.

20 Claims, 9 Drawing Sheets

AUDIO TRICK MODE

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to fast forward video for portions of the program that the user does not desire to watch (e.g., commercials).

For certain users, the above functionality may not be helpful for certain purposes. For example, for users where English is a second language, they may watch programming to learn English, but audio is not presented during trick mode (e.g., fast forwarding of the video) and the normal speed of audio sometimes makes it hard to understand a different language. There is currently no method of controlling a playback of an audio stream independently of the other data streams.

SUMMARY

To make a set-top box more functional to support various purposes, such as a user learning a foreign language more efficiently, features (e.g., playback speed, time shifting, etc.) of the audio stream can be controlled independent of other data streams (e.g., video).

In at least one embodiment of audio trick mode, the audio stream can be time shifted to a time independent of one or more data streams (e.g., video), and the speed of the audio stream can be re-played at a slow, normal or fast speed, while another stream (e.g., video) is paused. In another embodiment, the video frames of the video stream are controlled along with controlling the features (e.g., playback speed, time shifting, etc.) of the audio stream. In another embodiment, closed caption lookup function that provides the meaning of the word as well as grammar usage (e.g., sentence) is supported, so that the user could use the system as a learning center.

According to one embodiment, a method includes receiving, over a network, a data stream containing both an audio stream and a video stream, where the audio stream comprises frames that correspond to corresponding frames of the video stream. The audio and video streams are played from a first time to a second time at a first speed. An input to time shift the audio stream independent of the video stream is received, and after receiving such, the audio stream is time shifted to the first time. Then, the audio stream is re-played from the first time to the second time at a second speed different from the first speed.

According to one embodiment, a method includes receiving, over a network a data stream containing both an audio stream and a video stream, where the audio stream and video stream correspond to each other. The audio and video streams are played concurrently from a first time to a second time. An input to time shift the audio stream independently of the video stream is received, and the audio stream is time shifted to the first time. The audio stream is played from the first time to the second time while pausing the video stream at the second time.

According to one embodiment, a system includes a memory configured to store data streams, and a processor configured for: receiving the data streams containing both an audio stream and a video stream, wherein the audio stream comprises frames that correspond to corresponding frames of the video stream; playing the audio and video streams from a first time to a second time at a first speed; receiving input to time shift the audio stream independent of the video stream; after receiving the input to time shift the audio stream, time shifting the audio stream to the first time; and re-playing the audio stream from the first time to the second time at a second speed different from the first speed.

According to one embodiment, a method includes receiving a data stream only including an audio stream; playing the audio stream from a first time to a second time at a first speed; receiving input to time shift the audio stream; after receiving the input to time shift the audio stream, time shifting the audio stream to the first time; and re-playing the audio stream from the first time to the second time at a second speed different from the first speed.

BRIEF DESCRIPTION OF THE DRAWINGS

The same number represents the same element or same type of element in all drawings.

FIGS. 6A, 6B, 6C, 6D, 6E, and 6F illustrate at least one embodiment of FIG. 5.

DETAILED DESCRIPTION OF EMBODIMENTS

The various embodiments described herein generally provide apparatus, systems and methods which facilitate controlling audio independently or in conjunction with the video stream, referred herein as "audio trick mode."

Described below is a short summary of some embodiments. In the playback function of a program, the audio/video (A/V) stream is identified separately by different packet identifiers (pids), and, as such, the audio packet identifier (pid) can be controlled to feed the decoder with different speed from video to support different audio play speed (e.g., slow, normal, and fast). According to one embodiment, audio data is only fed into the decoder so that only audio will be controlled, and the speed of the audio can be changed without the video being changed. At same time, closed captioned data is received and used for a dictionary search or a content search so that a user can learn the meaning of the word and sentence, even providing some grammar usage (e.g., sentence).

In at least one embodiment, the A/V stream to be received, processed, outputted and/or communicated may come in any form. It is to be appreciated that the video stream may be supplied by any source, such as an over-the-air broadcast, a satellite or cable television distribution system, a digital video disk (DVD) or other optical disk, the internet or other communication networks, and the like. In at least one embodiment, the video stream may include text data, such as closed captioning data or subtitles, that is included in the video stream or associated with the video stream. Thus, in at least one embodiment, the video stream may comprise video data, audio data and text data.

Various details of these embodiments as explained below in more detail with regard to FIGS. 1-7.

Figure 1:
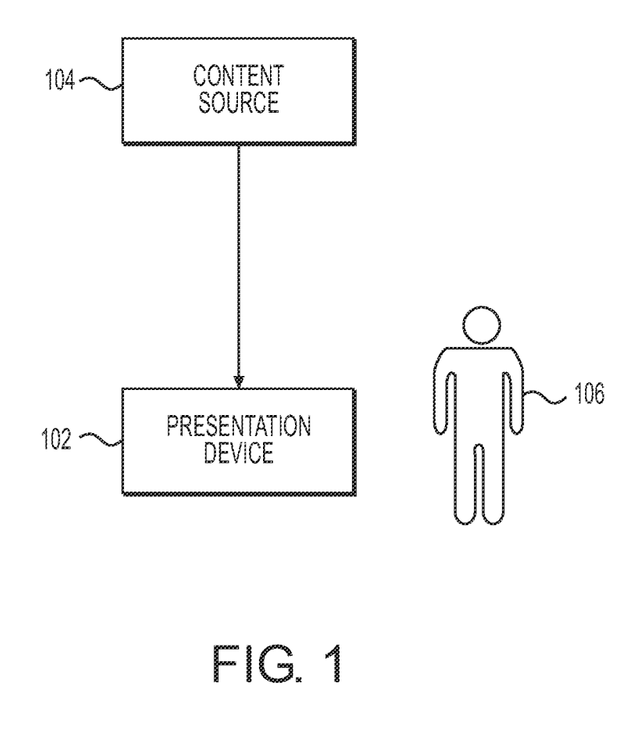
FIG. 1 illustrates an embodiment of an entertainment system.

Starting first with FIG. 1, FIG. 1 illustrates an embodiment of an entertainment system 100. The entertainment system 100 presents content to a user 106. In at least one embodiment, the content presented to the user 106 includes a video stream, such as a television program, movie or other recorded content and the like. The entertainment system 100 includes a presentation device 102 and a content source 104. Each of these components is discussed in greater detail below.

The presentation device 102 is configured to receive content from one or more content sources 104, and to present the received content to the user 106. In at least one embodiment, the presentation device 102 is a display device configured to display content to the user 106. In other embodiments, the presentation device 102 is a set-top box (e.g., a satellite or cable television converter box), digital video recorder (DVR), a laptop, a phone, a tablet, or other similar device that processes and provides one or more audio and/or video streams to a display device for presentation to a user. It is to be appreciated that the presentation device 102 may also be embodied as an apparatus combining the functionality of a display device and a set-top box, DVR or the like.

The presentation device 102 may receive A/V streams in any format (e.g., analog or digital format), and present the A/V streams to the user 106. In at least one embodiment, the presentation device 102 may control a received A/V streams to allow a user to adjust the speed of portions of the audio streams and/or video streams. More particularly, in at least one embodiment, the presentation device 102 may control the A/V streams by identifying the audio stream and changing the speed of the audio stream while pausing the video stream or also controlling the video stream (or other streams). Additionally, the presentation device 102 may include the text data (e.g., the closed captioning data or subtitles) along with the audio trick mode.

The content source 104 may comprise any system or apparatus configured to provide presentation data, such as a video stream and audio stream, to the presentation device 102. The content source 104 may be external or internal to the presentation device 102. The presentation device 102 and the content source 104 may be communicatively coupled through any type of wired or wireless connection, communication network and the like. Exemplary content sources include television distribution systems (e.g., over the air distribution systems, cable television distribution systems, satellite television distribution systems and broadband distribution systems), DVD players and other optical disk players, digital storage mediums (e.g., DVRs) and the internet. The video stream provided by the content source 104 may include text data, such as subtitles or closed captioning data. The text data may be embedded in the video stream (e.g., in vertical blanking interval line 21 or user data) or may be provided in a separate data stream. In at least one embodiment, the content source 104 may further provide metadata to the presentation device 102 that is utilized for controlling of the audio stream. Thus, through the operation of the entertainment system 100, the user 106 is presented with the controlled version of a video stream and a controlled version of the audio stream. Entertainment system 100 may include other elements or components not illustrated for the sake of brevity.

Figure 2:
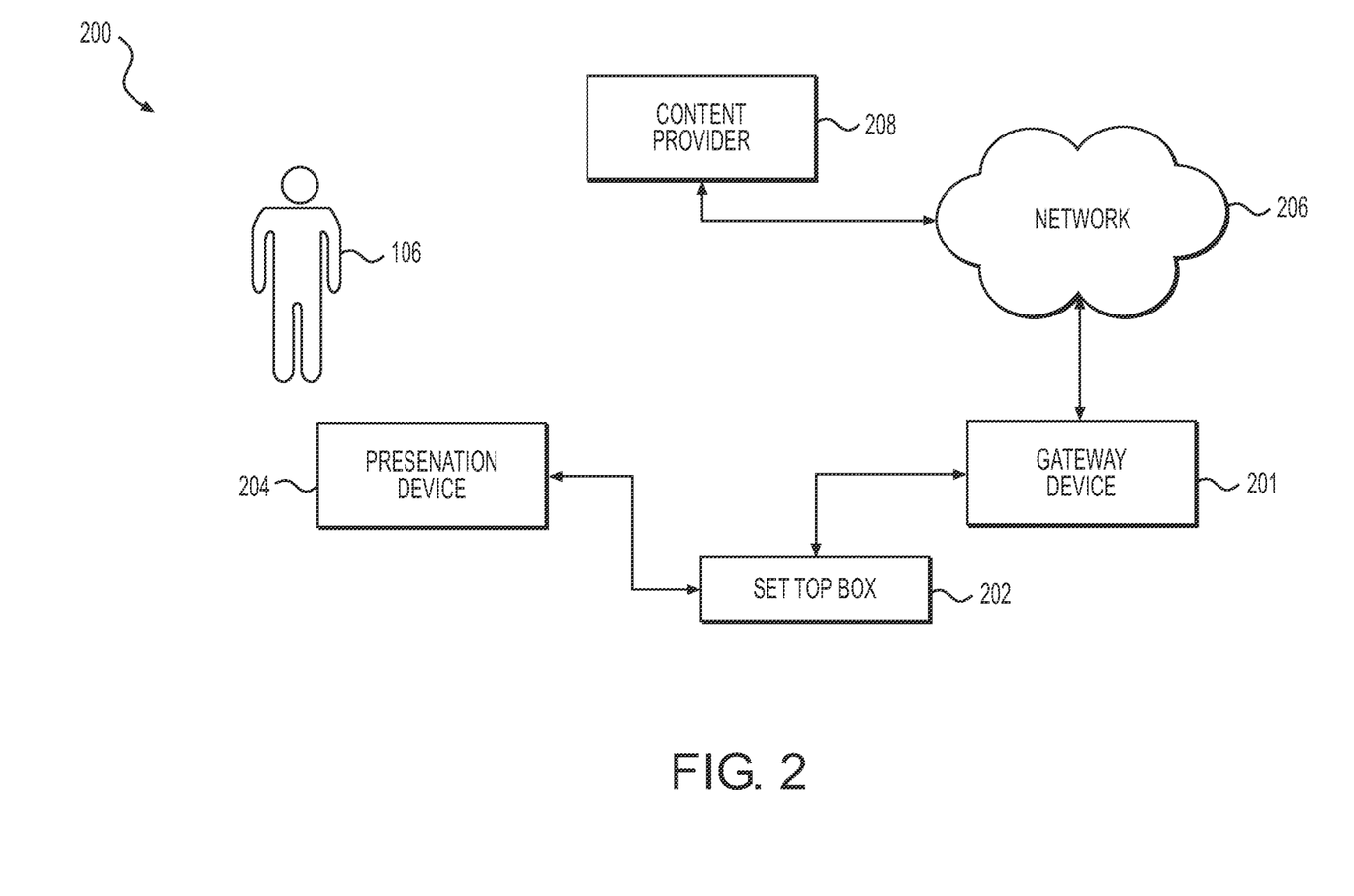
FIG. 2 illustrates an embodiment of a content distribution system.

FIG. 2 illustrates an embodiment of a content distribution system 200. The content distribution system 200 is configured to allow the user to control operations of the audio stream to a user 106. The content distribution system 200 includes a set-top box/DVR 202, a presentation/display device 204, a transmission network 206 and a content provider 208. Each of these components is discussed in greater detail below.

The display device 204 may comprise any type of device operable for receiving and displaying analog and/or digital video signals for video and audio. In at least one embodiment, the display device 204 may be a television set system, video display system with speakers that contains an integrated television converter device (e.g., an internal cable-ready television tuner housed inside a television), or, alternatively, that is connected to an external television converter device (e.g., a set-top box) for receiving and demodulating analog and/or digital signals for presentation by the display device 204. In at least some embodiments, the display device 204 includes a cell phone, laptop, or tablet. The display device should not be limited and can be any device which can display and present audio to a user.

Using an integrated television converter device, the display device 204 may be operable to communicate directly with the transmission network 206. For example, the transmission network 206 may comprise an over-the-air distribution system (e.g., free television), and the display device 204 may receive television broadcast signals using an internal or external antenna. The transmission network 206 may also comprise a cable television distribution system, and the display device 204 may comprise a cable ready television adapted to receive and demodulate analog or digital cable television signals for presentation to the user 106. A direct broadcast satellite or other type of wired or wireless communications network may also be used solely or in conjunction with the foregoing. In at least one embodiment, the display device 204 may communicate with the transmission network 206 through an intermediate device, such as a set-top box/DVR 202.

The set-top box/DVR 202 is communicatively coupled to the display device 204 through any type of wired or wireless connection. Exemplary wired connections include coax, fiber, composite video and high-definition multimedia interface (HDMI). Exemplary wireless connections include WiFi and Bluetooth. In at least one embodiment, the set-top box/DVR 202 may be embodied in a television converter device (e.g., a satellite television receiver). The set-top box/DVR 202 may also be incorporated into the display device 204. The set-top box/DVR 202 should not be limited and can be any device which is capable of receiving data streams and processing and managing presentation of such data streams on the presentation device, including a computer, server, streaming players (Apple TV, Roku, etc.), or other similar device.

The set-top box/DVR 202 captures and records video and audio content from attached devices onto a storage medium for subsequent presentation to the user 106. As illustrated in FIG. 2, the set-top box/DVR 202 is coupled to a content provider 208 (e.g., a satellite television provider) through the transmission network 206. Thus, the set-top box/DVR 202 receives a television signal (e.g., a broadcast) or other data signal (e.g., digital video data or other data formatted into a video stream) from the transmission network 206, and records television programs and other content provided by the content provider 208. The set-top box/DVR 202 may perform processing functions to parse text data associated with or embedded in the video stream for presentation on the display device 204. It is to be appreciated that the set-top box/DVR 202 may capture and record audio and video streams from other non-broadcast services, such as video recorders, DVD players, personal computers or the internet.

The set-top box/DVR 202 may include a remote control or other input device (not shown) that the user 106 may utilize for remotely operating the set-top box/DVR 202 and/or the display device 204. More specifically, a remote control may be operable for controlling the presentation of video and/or other data presented by the set-top box/DVR 202 on the display device 204.

The content provider 208 comprises any source or sources of television or other video signals. In at least one embodiment, the content provider 208 provides a television broadcast signal to the set-top box/DVR 202 over the transmission network 206. The content provider 208 may provide closed captioning data with the television broadcast signal. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The transmission network 206 may comprise any type of communication network utilized between the set-top box/DVR 202 and the content provider 208. Exemplary communication networks include television distribution networks (e.g., over the air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The set-top box/DVR 202 may communicate with the transmission network 206 through a wired or wireless connection. The transmission network 206 may distribute television broadcast and other data signals in digital or analog form. Exemplary video formats include moving picture experts group (MPEG), flash, Windows Media, and the like. Content distribution system 200 may include other elements or components not illustrated for the sake of brevity.

Figure 3:
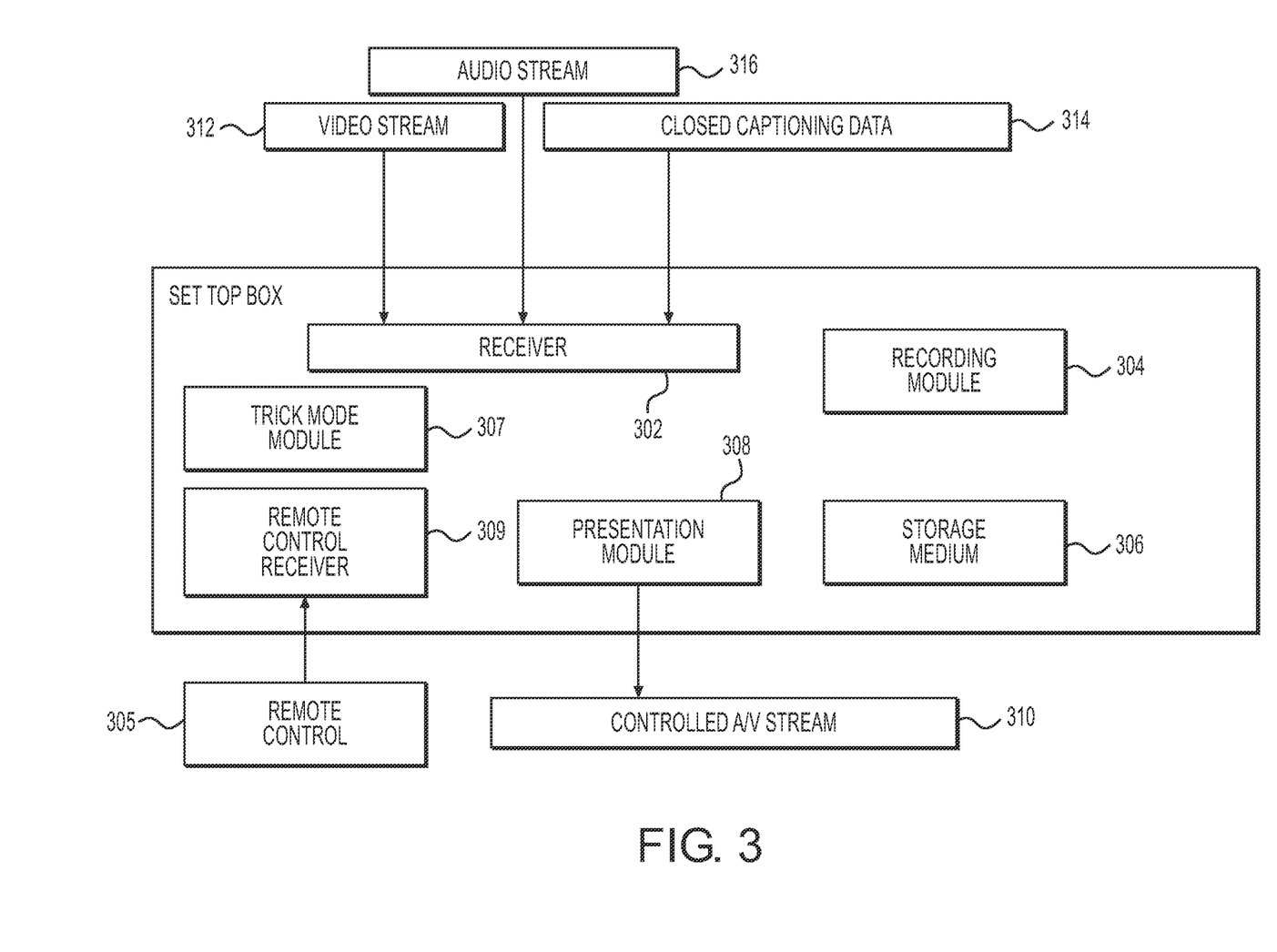
FIG. 3 illustrates an embodiment of functional components of the set-top box of FIG. 2.

FIG. 3 illustrates an embodiment of functional components of the set-top box/DVR 202 of FIG. 2. FIG. 3 will be discussed in reference to the content distribution system 200 illustrated in FIG. 2. The set-top box/DVR 202 comprises a receiver 302, a recording module 304, a storage medium 306, a presentation module 308 and a controlled A/V stream 310. Each of these components is discussed in greater detail below.

The receiver 302 receives a video stream 312, audio stream 316 and closed captioning data 314 from the transmission network 206 (see FIG. 2). The receiver 302 may comprise a wired or wireless receiver. In at least one embodiment, the closed captioning data 314 is embedded within the video stream 312 and/or audio stream 316. The receiver 302 may further receive other data from the transmission network 206, such as metadata instructing the set-top box/DVR 202 how to parse the closed captioning data 314.

The recording module 304 receives the video stream 312 and the closed captioning data 314, and stores the video stream 312 and the closed captioning data 314 on the storage medium 306. The storage medium 306 may be any type of temporary or persistent storage device capable of storing the video stream 312 and the closed captioning data 314. The storage medium 306 may be internal and/or external to the set-top-box/DVR 202 and may include one or more storage devices. For example, the storage medium 306 may be an internal hard drive or flash memory. The video stream 312 and the closed captioning data 314 may be stored together and/or separately on the storage medium 306.

The trick mode module 307 retrieves the video stream 312, audio stream 316 and/or the closed captioning data 314 and also is configured to receive instructions from the remote control 305 via the remote control receiver 309. The remote control 305 may have controls to change the speed of the audio presented to the user 106. For example, the remote control may have a button that can slow the speed of the audio by a multiplier (2X, 3X, 4X, and so on).

The presentation module 308 is configured to present recorded video streams and audio streams to the user 106 (see FIG. 2). The presentation module 308 retrieves the video stream 312, audio stream 316 and/or the closed captioning data 314 from the storage medium 306, and presents the content of the video stream 312, audio stream 316 and/or the closed captioning data 314 to the user 106 (see FIG. 2). In at least one embodiment, the presentation module 308 receives information from the trick mode module 307 providing the controlled audio stream 316 and controlled video stream 312 based on the instructions received by the user in order to implement audio trick mode. For example, the presentation module 308 controls the audio stream 316 to present the time shifted and/or slower/faster speed of the audio to the user 106 (see FIG. 2). If applicable, the presentation module 308 also presents the closed captioning data 314 corresponding to the portions of the audio stream 316 that are presented to the user 106. The audio trick mode may be used for previously recorded A/V streams, or may be also used for live A/V streams and the present application should not be so limited.

Those of ordinary skill in the art will appreciate that the various functional elements 302 through 310 shown as operable within the set-top-box/DVR 202 may be combined into fewer discrete elements or may be broken up into a larger number of discrete functional elements as a matter of design choice. For example, the trick mode module (not shown), the recording module 304 and/or the presentation module 308 may be combined into a single processing module. Thus, the particular functional decomposition suggested by FIG. 3 is intended merely as exemplary of one possible functional decomposition of elements within the set-top box/DVR 202.

Various embodiments are discussed below with respect to FIGS. 4-7. It should be noted that one or more steps/functions as provided in FIGS. 4-7 may be implemented in a cloud server instead of locally on the set-top box/DVR 202 or gateway device 201 (e.g. a router) and the present application should not be limited to all of the steps in the methods being performed locally on these devices. For example, one or more steps/functions as provided in FIGS. 4-7 may be implemented in a cloud server and, one or more steps/functions as provided in FIGS. 4-7 may be performed on the set-top box/DVR 202 or gateway device 201.

Figure 4:
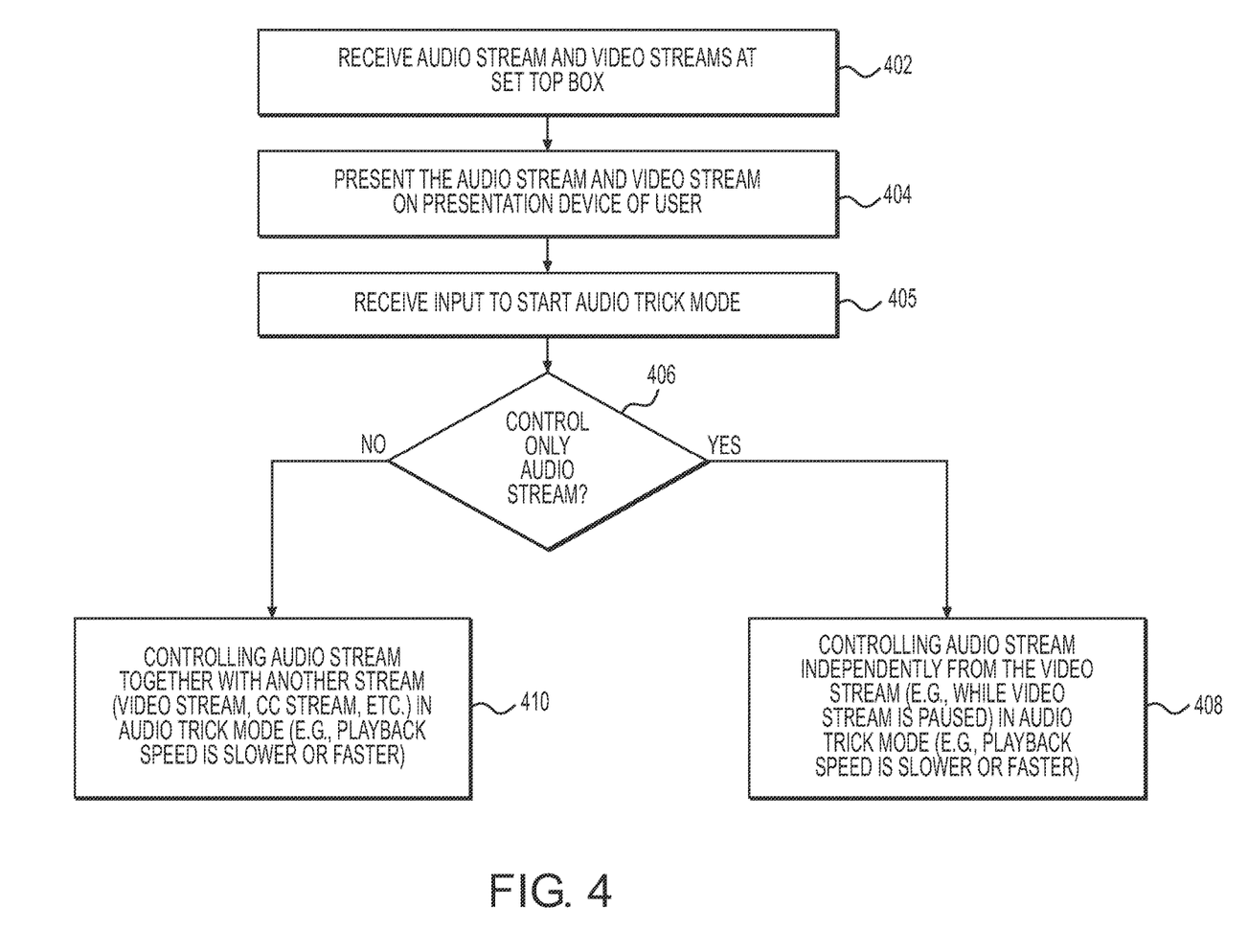
FIG. 4 illustrates a method of audio trick mode, according to some embodiments.

FIG. 4 illustrates a method of audio trick mode, according to some embodiments. In block 402, the set-top box receives an audio stream and a video stream. These streams may be received as separate streams or received in a single combined stream. Regardless, in an embodiment, the streams are decoded and saved as separate streams in the recording device so that the audio stream and video stream can be heard/viewed by the user, and so that any frames the audio stream and video stream can be accessed.

In block 404, the audio stream and the video stream are presented to the user via the presentation device. For example, a program is accessed and played on a user's television so that the user hears the audio and corresponding video of the program. The user may watch the program from the beginning of the program or in the middle of the program.

In block 405, the system receives an input or request from the user to start audio trick mode. Such input may be received in response to the user depressing a button on a remote control of the set-top box, where such button could be a time shifting button (e.g., rewind), a change-of-playback-speed button (e.g., slower playback button), or any other button which can indicate that audio trick mode is desired and that the user desires to control the audio stream in some fashion.

In block 406, the system determines if the audio stream will be the only stream controlled or if one or more other streams (e.g., video stream, closed captioned stream, etc.) will be controlled with the audio stream. For example, as described in more depth below with regards to FIGS. 5 and 6, the user can control the audio stream independently of the video stream, such as by pausing the video stream while playing (or replaying) the audio stream at a desired speed. In another example, as described in more depth below with regards to FIG. 7, the user can control the audio stream and video stream together, such as by rewinding and playing/replaying (at a desired speed) both the video stream and the audio stream concurrently. The system can make this determination based on the input or request received from block 405, from predefined, prestored settings set prior to activating audio trick mode, or in response to a request sent to the user.

If only the audio stream will be controlled, the method may proceed to block 408 where the user only controls the audio stream independently of the video stream in audio trick mode, as is discussed in more depth below with regards to FIGS. 5 and 6. For example, the audio stream can be rewound to a time and played back at a slower speed.

If the audio stream will be controlled along with one or more other stream (e.g., video stream, closed captioned stream, etc.), the method may proceed to block 410 where the user only controls the audio stream independently of the video stream, as is discussed in more depth below with regards to FIGS. 5 and 6. For example, both the audio stream and video stream can be rewound together to a time and played back together at a slower speed.

Figure 5:
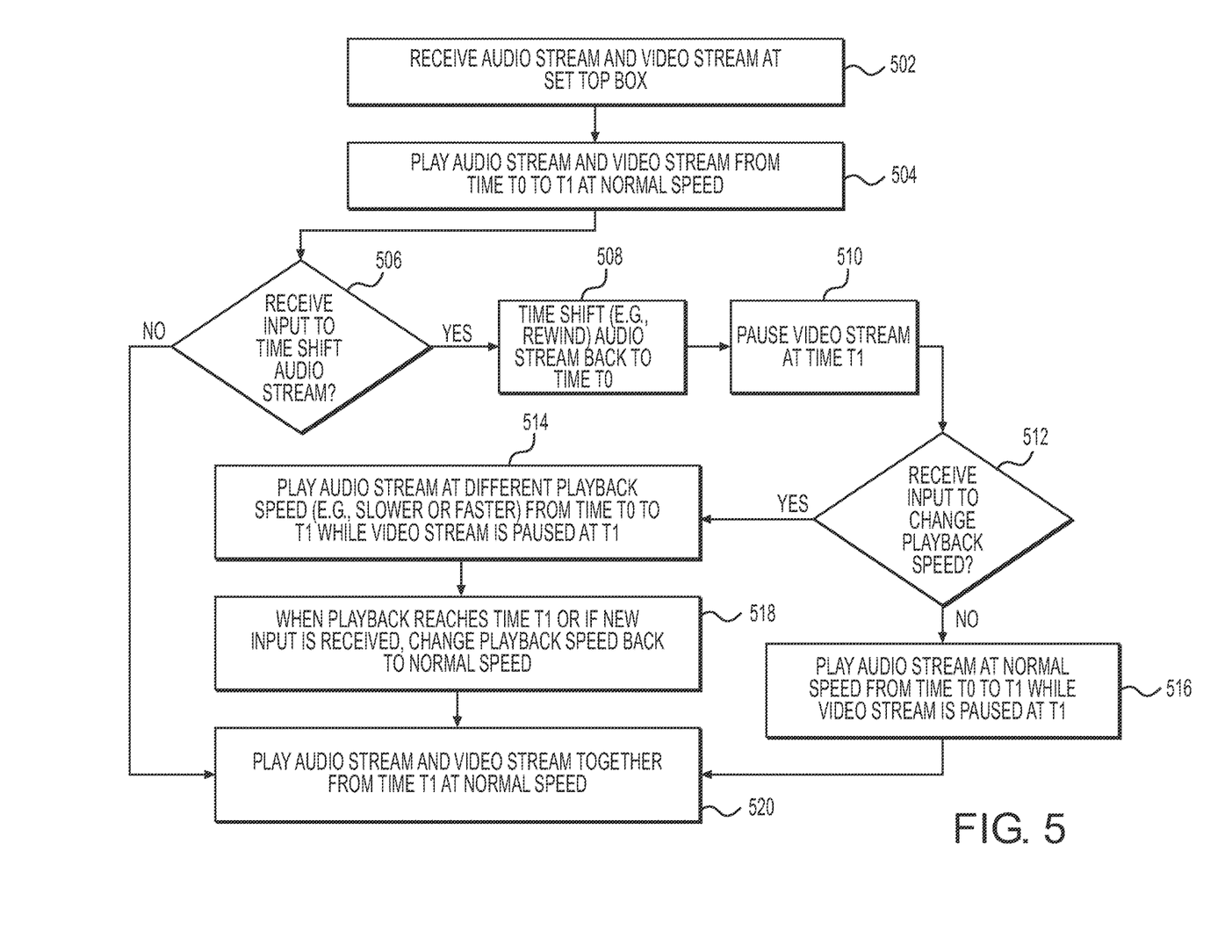
FIG. 5 illustrates a method of audio trick mode, according to some embodiments.

FIGS. 5 and 6 illustrate a method of audio trick mode of controlling only the audio stream, according to some embodiments. These figures will be discussed below.

Figure 6A:
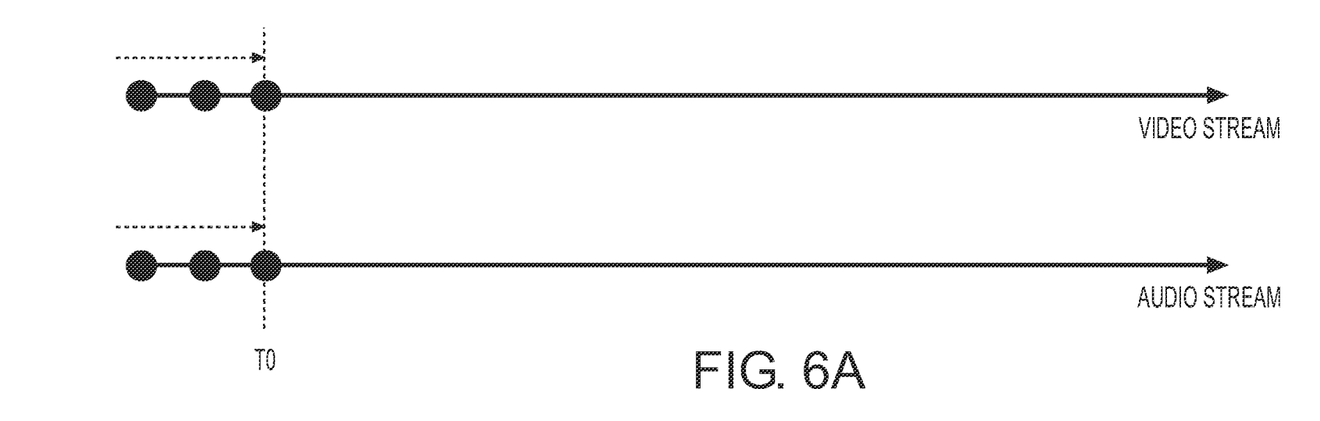

Starting first with FIG. 5, in block 502, the set-top box receives an audio stream and a video stream similar to block 402 of FIG. 4. These streams may be received as separate streams or received in a single combined stream. Regardless, in an embodiment, the streams are decoded and saved as separate streams in the recording device so that the audio stream and video stream can be heard/viewed by the user, and so that any frames of the audio stream and video stream can be accessed and played. As shown in the embodiment of FIG. 6A, the user may play a program, such as playing the program to time T0, which corresponds to a time period after the user is playing a program.

Figure 6B:
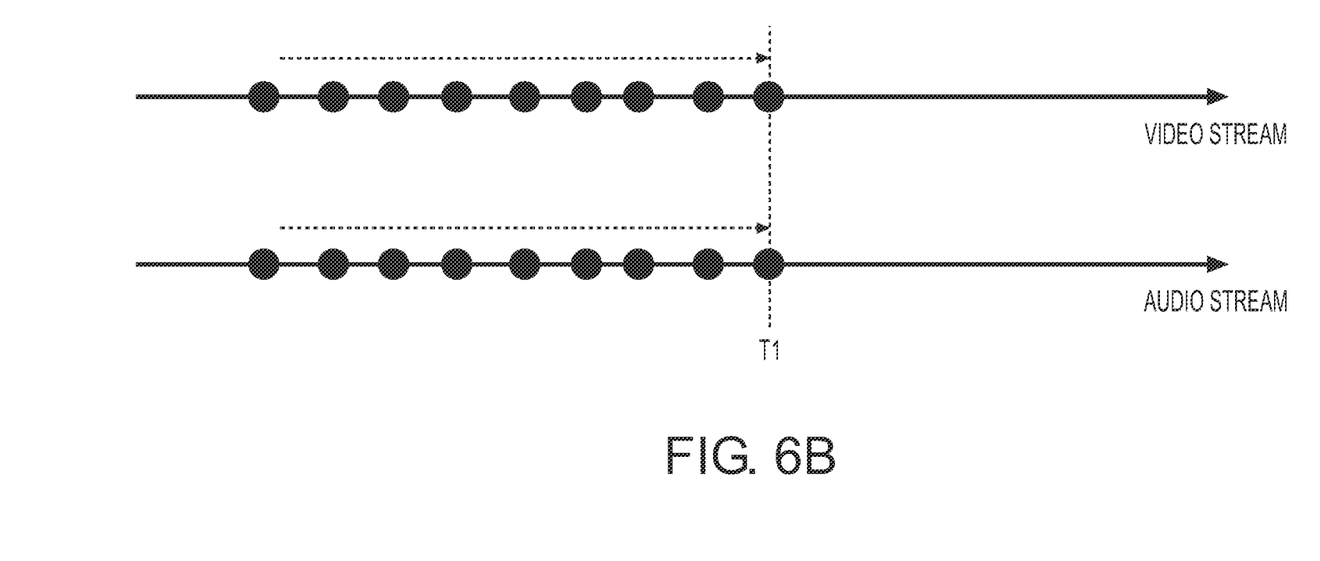

In block 504 of FIG. 5 and FIG. 6B, the audio stream and the video stream are presented to the user via the presentation device from time T0 of the program to time T1 of the program. Time T0 corresponds to a frame of a program that may be in the beginning of the program or in the middle of the program after the user has already played the program after a time period. Time T1 corresponds to frames of the program that is after T0. In this regard, a user can play the program at normal playback speed from time T0 to time T1.

In block 506, the system receives an input to time shift the audio stream. In this regard, if a user wants to initiate audio trick mode when programming is at time T1, the user can send requests using a remote control or controls on the set-top box in order to instruct the set-top box to rewind the program in order to play/replay a section of the program at a desired speed.

Figure 6C:
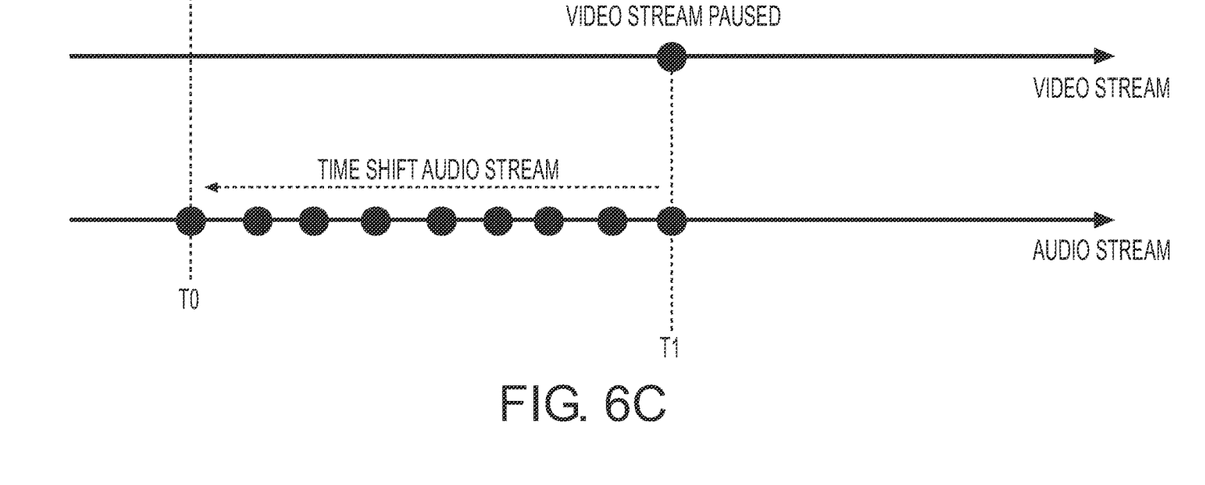

In block 508 and as shown at FIG. 6C, the audio stream is time shifted from one time (T1) to another time (T0). This can be accomplished by the system receiving a time shifting command (e.g., rewind, fast forward, jump 10 seconds forward, jump 10 seconds back, etc.). In the embodiments of block 508 and as shown at FIG. 6C, the audio stream is time shifted from time T1 back to time T0 so that the user can replay the program from time T0 to T1.

During this time, the video stream is paused, as shown at FIG. 6C and in block 510, while the audio stream is time shifted, according to at least one embodiment. In order to accomplish this, the system accesses the audio stream while not adjusting the separate video stream. In this regard, the video at time T1 may be displayed to the user while the system accesses and controls the audio stream in audio trick mode.

In decision block 512 of FIG. 5, the system determines if an input or request to change the playback speed as a feature of audio trick mode has been received. This input or request may be issued in response to a button on the remote control or on the set-top box, in some embodiments. For example, the remote control may have a button which, when pressed by the user, will be a request to slow the speed of the playback. There may be a series of buttons to allow for differing levels of playback including 2×, 3×, 10×, etc. slowness relative to normal playback.

If the system receives a request to play the audio stream at a playback speed different than normal playback, the method proceeds to block 514; otherwise, the method proceeds to block 516.

In block 516 of FIG. 5, the system replays the program at the normal playback speed from time T0 to time T1 in the same manner as described in block 504 and then the method proceeds to block 520.

Figure 6D:
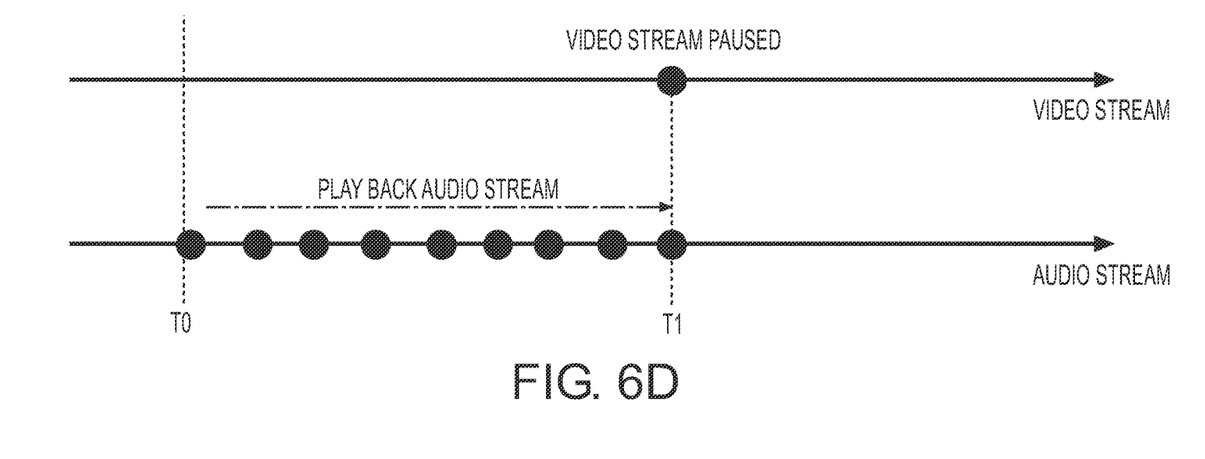
Figure 6E:
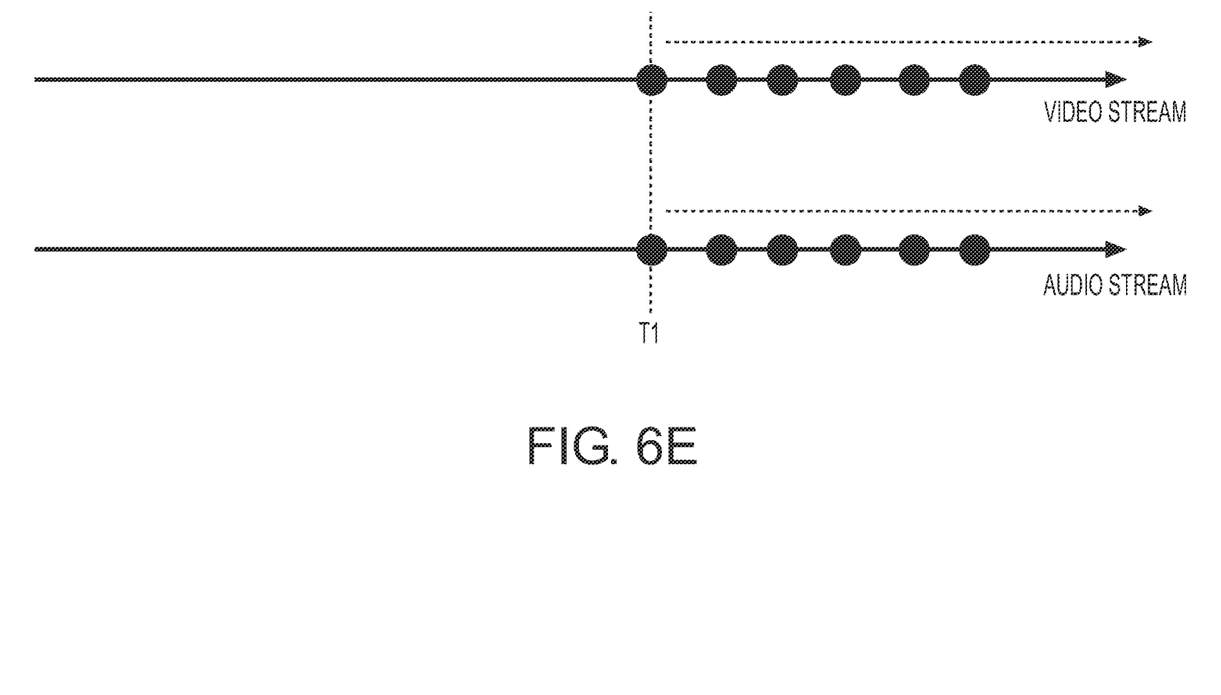

In block 514 of FIG. 5 and at FIG. 6D, the system plays the program at a slower speed relative to normal playback speed from time T0 to time T1. This is done by playing less audio frames in a time period relative to the normal playback speed. In this regard, the user is able to play the audio stream at a rate that is slow. This allows the user to re-hear a portion of a program very slowly and thus to control the audio stream independently of the video stream, which has not been done prior to the present invention. During the time of slow playback of the audio stream, the video stream is paused. However, as discussed below with regard to FIG. 7, the video and audio can be controlled and replayed together in audio trick mode.

In one embodiment, the audio stream may be played at block 504 in a first language, and in block 514, the user may play the audio stream in a second language. The user can select a different language or be prompted as to whether the user wishes to play the audio in a different language. For example, the user may be a Chinese language person desiring to learn English. As such, the user may listen to the program in Chinese until time T1 but want to hear the program in English from time T0 to time T1 in a slow playback mode along with receiving closed captioned text in English (and/or Chinese). In this regard, the user is able to learn English while watching the program and can be assisted to do so by replaying the audio in a slower manner and with closed captioned text in English (or in Chinese). The user is also able to look up the closed captioned text to determine the translation and the correct pronunciation of the word (and such function would pause the playing/replaying of the program).

The user is allowed to continue the audio trick mode until the time gets to time T1, which is the frame where the video stream is paused.

Then, when the audio stream reaches time T1, as described in block 518, the playback speed is changed from audio trick mode to normal playback mode. In one embodiment, the system automatically changes the playback speed from audio trick mode to normal playback speed in response to the audio stream reaching the paused video stream. In another embodiment, the user manually ends audio trick mode using a control button and in response to ending audio trick mode, both the audio stream and video stream are concurrently played.

Next, after the audio stream reaches time T1, as described in block 520, the system plays both the audio stream and the video stream concurrently so that the user continues watching the program at normal playback speed.

In some embodiments, whenever the audio stream is controlled, the closed captioned stream can be controlled with the same commands and at the same time as the audio stream. For example, when the audio stream is time shifted from a first time to a second time, the closed captioned stream can also be time shifted from the first time to the second time concurrently with the audio stream.

Also, when the audio stream is played in audio trick mode, the closed captioned stream can be played concurrently and with the same command. For example, when the audio stream is played at a certain playback speed, such as 2× slow playback speed, the closed captioned stream is also played at that same playback speed, such as the 2× slow playback speed in this example. In this regard, the closed captioned stream is replayed at the same speed as the audio stream so that when the audio is being played, the closed captioned data is being presented at the same time so that the user can read the closed captioned text while hearing the slow played audio.

In one embodiment, the audio stream is played independently of both the video stream and the closed captioned stream.

Figure 7:
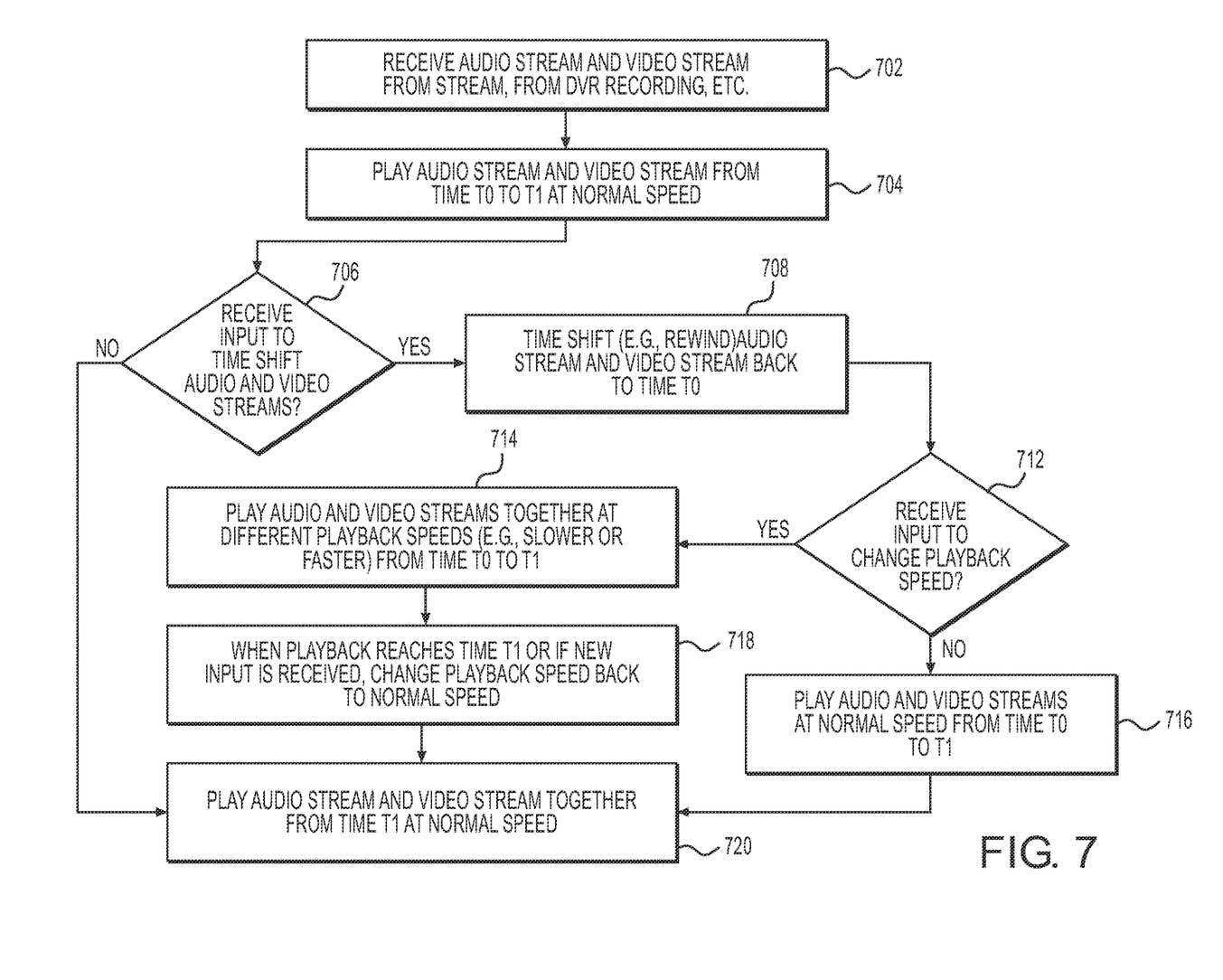
FIG. 7 illustrates a method of audio trick mode, according to other embodiments.

In another embodiment, both the audio and video streams are controlled concurrently in audio trick mode. For example, FIG. 7 illustrates a method of audio trick mode where, according to some embodiments. FIG. 7 is similar to FIG. 5. For example, blocks 702 and 704 are similar to blocks 502 and 504, respectively.

Specifically, in block 702, the set-top box receives an audio stream and a video stream, and the user may play a program, such as playing the program to time T0, which corresponds to a time period after the user is playing a program, and in block 704, the audio stream and the video stream are presented to the user via the presentation device from time T0 of the program to time T1 of the program. In this regard, a user can play the program at normal playback speed from time T0 to time T1.

In block 706, the system receives an input to time shift the audio stream. In this regard, if a user wants to initiate audio trick mode when programming is at time T1, the user can send requests using a remote control or controls on the set-top box in order to instruct the set-top box to rewind the program in order to play/replay a section of the program at a desired speed.

In block 708, both the audio stream and the video stream are time shifted concurrently from time T0 to T1 so that the user can replay the program audio and video from time T0 to T1.

In decision block 712 (similar to block 512 of FIG. 5), the system determines if an input or request to change the playback speed as a feature of audio trick mode has been received. As mentioned above, this input or request may be issued in response to a button on the remote control or on the set-top box, in some embodiments. For example, the remote control may have a button which, when pressed by the user, will be a request to play the speed of the playback to be slow, fast, etc. There may be a series of buttons to allow for differing levels of playback including 2×, 3×, 10×, etc. slowness relative to normal playback.

If the system receives a request to play the audio stream at a playback speed different than normal playback, the method proceeds to block 714; otherwise, the method proceeds to block 716.

In block 716, the system replays both the audio and video streams at the normal playback speed from time T0 to time T1 in the same manner as described in block 704 and then the method proceeds to block 720.

In block 714, the system plays the audio stream and video stream at a slower speed relative to normal playback speed from time T0 to time T1. This is done by playing less audio frames and less video frames in a time period relative to the normal playback speed. In this regard, the user is able to play the audio stream at a rate that is slow as well as playing less video streams at that same rate. This allows the user to re-watch and re-hear a portion of a program slowly and thus to control both the audio and video stream concurrently, which has not been done prior to the present invention. During the time of slow playback of the audio and video streams, the closed captioned stream may also be concurrently controlled with the audio and video streams.

Then, when the audio stream reaches time T1, as described in block 518, the playback speed is changed from audio trick mode to normal playback mode. In one embodiment, the system automatically changes the playback speed from audio trick mode to normal playback speed in response to the audio and video streams reaching time T1. In another embodiment, the user manually ends audio trick mode using a control button and in response to ending audio trick mode, both the audio stream and video stream are concurrently played at normal playback. In another embodiment, the audio trick mode continues and is played past time T1.

Next, after the audio stream reaches time T1, as described in block 520, the system plays both the audio stream and the video stream concurrently so that the user continues watching the program at normal playback speed in one embodiment.

As mentioned above, the system may have a closed caption lookup function which is able to look up a closed captioned word selected by the user via the remote in order to assist the user to learn the meaning of the word, correct pronunciation of the word, translation of the word, etc.

In another embodiment, when rewinding the audio stream, the audible words are presented in reverse order. For example, if a program states "WORD1, WORD2, WORD3"

in that order in forward playing mode, but the user now rewinds the audio stream, the audio stream could present this sentence backwards, such as "WORD3, WORD2, WORD1" in that order. This allows the user to find a word audibly while rewinding the audio stream.

In yet another embodiment, audio is repeated with displayed closed captioning data. For example, if a repeat function is activated (e.g., hitting a button on a remote control to repeat the recently played audio), the result is that the audio will be played for the closed captioning data displayed on the screen. For example, if an audio stream is being played from a first time to a second time and the words of a corresponding closed caption function (i.e., having frames that correspond to frames of the audio stream) from the first time to the second time, once the user activates the repeat function, the system identifies the time of the first word and the last word currently displayed at the third time (in this example, that is the first time and second time respectively), time shifts the audio stream to the first time and plays the audio stream from the first time to the second time. The speed of the audio stream may be played at a slower or faster speed as well.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present disclosure has been presented for purposes of illustration and description, but is not intended to be exhaustive or limited to embodiments of the disclosure in the form explicitly disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Although specific embodiments were described herein, the scope of the invention is not limited to those specific embodiments. The scope of the invention is defined by the following claims and any equivalents therein.

What is claimed is:

1. A method comprising:
receiving, over a network, both an audio stream and a video stream, wherein the audio stream comprises frames that correspond to corresponding frames of the video stream;
playing the audio and video streams from a first time to a second time at a first speed;
receiving input to time shift the audio stream;
after receiving the input to time shift the audio stream, time shifting the audio stream independent of the video stream to the first time; and
re-playing the audio stream from the first time to the second time at a second speed different from the first speed.

2. The method of claim 1, wherein the video stream is paused at the second time from when the audio stream is time shifted to the first time until the audio stream is re-played to the second time so that the audio stream is controlled independent of the video stream.

3. The method of claim 2, further comprising after the re-playing the audio stream from the first time to the second time while the video stream is paused at the second time, playing concurrently the audio stream and video stream from the second time to a third time.

4. The method of claim 1, further comprising:
after receiving the input to time shift the audio stream to the first time, time shifting the video stream to the first time along with the audio stream;
playing, from the first time to the second time, both the audio stream and video stream concurrently at the second speed.

5. The method of claim 4, further comprising:
receiving a closed captioned stream;
time shifting the closed captioned stream to the first time; and
presenting the closed captioned stream at the second speed from the first time.

6. The method of claim 1, wherein the audio stream comprises a first language audio stream and a second language audio stream, the first language audio stream being an audio stream playing a first language and the second language audio stream being an audio stream playing a second language different from the first language, and
wherein the playing comprises playing the first language audio stream from the first time to the second time,
wherein the input received comprises an input to play the second language audio stream from the first time to the second time, and
wherein the re-playing comprises playing the second language audio from the first time to the second time.

7. The method of claim 6, wherein the playing the second language audio stream comprises playing the second language audio stream at the second speed while playing closed captioned text in the second language.

8. The method of claim 6, further comprising playing a closed captioned stream of the first language from the first time to the second time concurrently with the playing the second language audio stream from the first time to the second time.

9. The method of claim 1, wherein the playing the audio stream from the first time to the second time occurs while the video is paused at the second time.

10. The method of claim 1, further comprising
decoding and storing the audio stream separately in memory from at least one other data stream so that the audio stream is configured to be controlled independently of the at least one other data stream.

11. A system comprising
a memory configured to store data streams;
a processor configured for:
receiving an audio stream and a video stream, wherein the audio stream and video stream correspond to each other;
playing the audio and video streams concurrently from a first time to a second time;
receiving input to time shift the audio stream independently of the video stream;
time shifting the audio stream to the first time while pausing the video stream at the second time; and
playing the audio stream from the first time to the second time while the video stream is paused at the second time.

12. The system of claim 11,
wherein the audio stream comprises frames that correspond to corresponding frames of the video stream;
wherein the input is received to time shift the audio stream independent of the video stream; and
wherein the video stream is paused at the second time from when the audio stream is time shifted to the first time until the audio stream is re-played to the second time so that the audio stream is controlled independent of the video stream.

13. The system of claim 11, wherein the processor is further configured for: after the re-playing the audio stream from the first time to the second time while the video is paused at the second time, playing concurrently the audio stream and video stream from the second time to a third time.

14. The system of claim 11, wherein the processor is further configured for:
decoding and storing the audio stream separately in memory from at least one other data stream so that the audio stream is configured to be controlled independently of the at least one other data stream.

15. The system of claim 11, wherein the processor is further configured for:
receiving a closed captioned stream;
time shifting the closed captioned stream to the first time; and
presenting the closed captioned stream at the second speed from the first time.

16. The system of claim 11, wherein the audio stream comprises a first language audio stream and a second language audio stream, the first language audio stream being an audio stream playing a first language and the second language audio stream being an audio stream playing a second language different from the first language, and
wherein the playing comprises playing the first language audio stream from the first time to the second time,
wherein the input received comprises an input to play the second language audio stream from the first time to the second time, and
wherein the re-playing comprises playing the second language audio from the first time to the second time.

17. The system of claim 16, wherein the playing the second language audio stream comprises playing the second language audio stream at the second speed while playing closed captioned text in the second language.

18. The system of claim 16, wherein the processor is further configured for playing a closed captioned stream of the first language from the first time to the second time concurrently with the playing the second language audio stream from the first time to the second time.

19. The system of claim 16, wherein the processor is further configured for:
playing a closed captioned stream so that a series of words are displayed on a screen at a third time;
receiving instructions to repeat an audio stream;
replaying the audio stream corresponding to only the words displayed on the screen when the audio stream reaches the third time.

20. A method comprising:
receiving a data stream only including an audio stream;
playing the audio stream from a first time to a second time at a first speed;
receiving input to time shift the audio stream;
after receiving the input to time shift the audio stream, time shifting the audio stream to the first time; and
re-playing the audio stream from the first time to the second time at a second speed different from the first speed.

* * * * *